A. N. FAUPEL.
EAVES TROUGH.
APPLICATION FILED AUG. 12, 1911.
1,026,085.
Patented May 14, 1912.
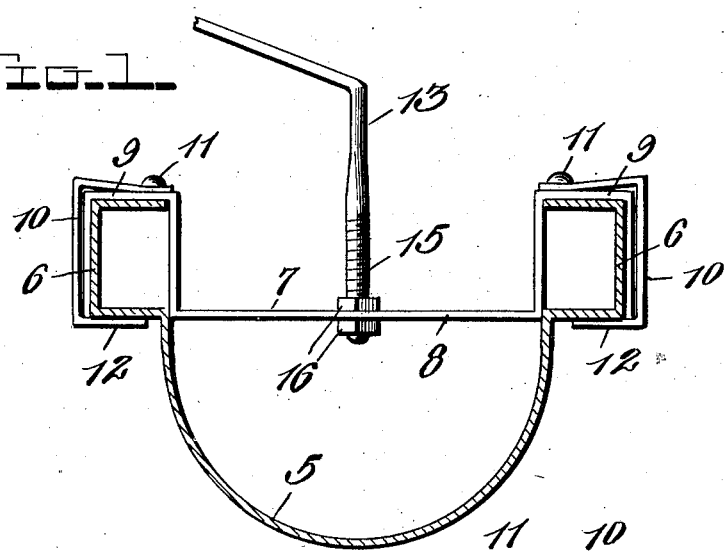
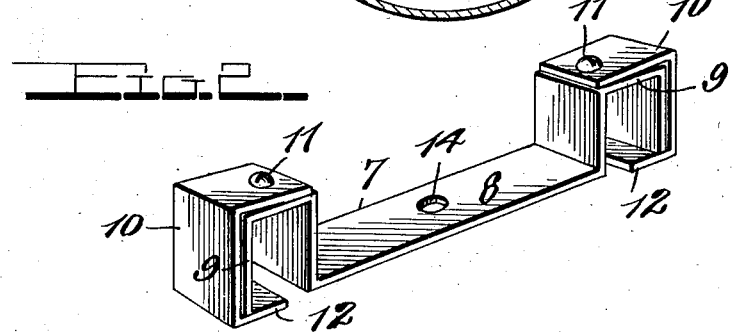
Witnesses
Chas. L. Griesbauer.
L. H. Ellis.
Inventor
A. N. Faupel,
By Watson E. Coleman.
Attorney

UNITED STATES PATENT OFFICE.

ARCHIBALD N. FAUPEL, OF JOHNSTOWN, PENNSYLVANIA.

EAVES-TROUGH.

1,026,085.  Specification of Letters Patent.  Patented May 14, 1912.

Application filed August 12, 1911. Serial No. 643,716.

*To all whom it may concern:*

Be it known that I, ARCHIBALD N. FAUPEL, a citizen of the United States, residing at Johnstown, in the county of Cambria and State of Pennsylvania, have invented certain new and useful Improvements in Eaves-Troughs, of which the following is a specification, reference being had to the accompanying drawings.

This invention relates to eaves-troughs and hangers therefor, the primary object of the invention residing in the provision of simple and effective means for easily and quickly securing the trough in position upon the wall of a building.

Another object of the invention is to provide a trough of peculiar construction, in combination with which I provide an adjustable brace bar which connects the opposite longitudinal edges of the trough and is longitudinally movable thereon so that the hanger bars may be readily connected to said brace bars.

A further object of the invention is to provide an eaves-trough having its longitudinal edges bent to form rectangular beads open at their inner sides, a transverse brace bar slidable upon the beaded edges of the trough whereby the brace may be positioned for engagement by the hanger, and means carried by the brace bar to removably retain the same upon the trough.

Still another object of the invention resides in the provision of an improved hanger for eaves-troughs which is so arranged as to arrest the passage of large particles of foreign matter and prevent their entry into the conducting pipe.

With the above and other objects in view, the invention consists of the novel features of construction, combination and arrangement of parts hereinafter fully described and claimed, and illustrated in the accompanying drawings, in which Figure 1 is a transverse section illustrating the preferred embodiment of my improved eaves-trough and hanger; Fig. 2 is a detail perspective view of the transverse brace bar removed from the trough.

Referring in detail to the drawing 5 designates the eaves-trough which is preferably, though not necessarily, of semicircular form in cross section. The longitudinal edges of the trough 5 are bent to form the rectangular beads 6 thereon which are open at their inner sides as clearly shown in Fig. 1. These rectangular beads provide greater strength and rigidity in the trough than the common cylindrical beads.

When the trough is constructed from tin, galvanized sheet iron or other comparatively flexible material, I provide the transverse brace bars 7 which serve to retain the trough in its proper form and also provide means for the attachment of the hanger bars.

As will be seen from reference to Fig. 2, the hanger bar is formed from a single bar of metal and the intermediate portion 8 thereof is disposed between the beaded edges of the trough and in substantially the same plane as the bottom walls of the beads. Each end of the brace bar 7 is bent into substantially U-shaped form as indicated at 9 and extends upwardly and across the open inner sides of the beads, then across the top thereof and down upon the outer faces of said beads. To the intermediate portion of each of the U-shaped ends of the brace bar 7, one end of a heavy leaf spring 10 is riveted as indicated at 11. These springs are also of substantially U-shaped form and extend in parallel relation to the ends of the brace bar, and have their free ends laterally disposed and extended beneath the rectangular beads 6 of the trough as shown at 12.

The brace bars 7 are arranged at intervals upon the eaves-trough and to the same the hanger bars 13 are adapted to be connected. The intermediate portions 8 of the transverse bars 7 are provided with openings 14 to receive the cylindrical threaded lower ends 15 of the hanger bars. Clamping nuts 16 are threaded upon the ends of the hanger bars and are adapted to engage the opposite faces of the brace bars 7 to rigidly secure the hanger thereto.

The eaves-trough 5 is made in sections of suitable length which are adapted to be rigidly connected by means of rivets or other suitable fastening devices. The springs 10 carried by the bars 7 are sufficiently heavy to support the trough under all conditions, the ends 12 of said springs frictionally engaging the under sides of the beads 6. When the eaves-trough is placed in position upon the building wall, the transverse bars 7 are moved along the beads of the trough until they are in proper position to receive the lower ends of the hangers 13. The hangers may then be quickly connected to said bars and the mounting of the trough is completed. The above described arrangement of parts provides a construction which is simple, durable and permits of the proper arrangement of the trough beneath the eaves of the roof in a minimum length of time.

From the above it will be observed that in each form of the invention the transverse brace bars are disposed below the upper edges of the troughs, and serve to hold the same in their proper form. The brace bars are arranged at a sufficient height above the bottom of the trough to permit of the free flow of the water therein but will effectually prevent the passage of large quantities of leaves or paper into the conducting pipe at the end of the trough, thereby obviating the liability of the same becoming clogged.

From the foregoing it is thought that the construction, operation and many advantages of my invention will be fully understood. By my improved form of trough and the means for hanging the same, a maximum of rigidity and durability is secured while at the same time the expense of construction is not materially increased over the common forms of such devices now in use. It will of course be obvious that the beads on the edges of the trough may be of any desired proportions and that the proportions of the transverse brace bars would also be varied according to the weight and proportions of the trough.

While I have shown and described the preferred construction and arrangement of the various elements, it will be understood that the invention is susceptible of a great many modifications without departing from the essential feature or sacrificing any of the advantages thereof.

Having thus described the invention what is claimed is:—

The combination with an eaves trough having a bead formed on each of its longitudinal edges, of a rigid transverse brace bar bent at its ends to receive the beaded edges of the trough, and spring plates rigidly fixed upon the ends of said brace bar and extending beyond the beaded edges of the trough and having vertically disposed portions spaced therefrom, the extremities of said spring plates extending beneath the beads on the trough and closely engaging with the same to yieldingly support the trough for movement in a vertical plane independent of the brace bar.

In testimony whereof I hereunto affix my signature in the presence of two witnesses.

ARCHIBALD N. FAUPEL.

Witnesses:
M. C. LYDDANE,
GEO. S. LIVINGSTON.

---

Copies of this patent may be obtained for five cents each, by addressing the "Commissioner of Patents, Washington, D. C."